J. B. BLACK.
INSECT EXTERMINATOR.
APPLICATION FILED DEC. 9, 1916.
1,326,320.
Patented Dec. 30, 1919.
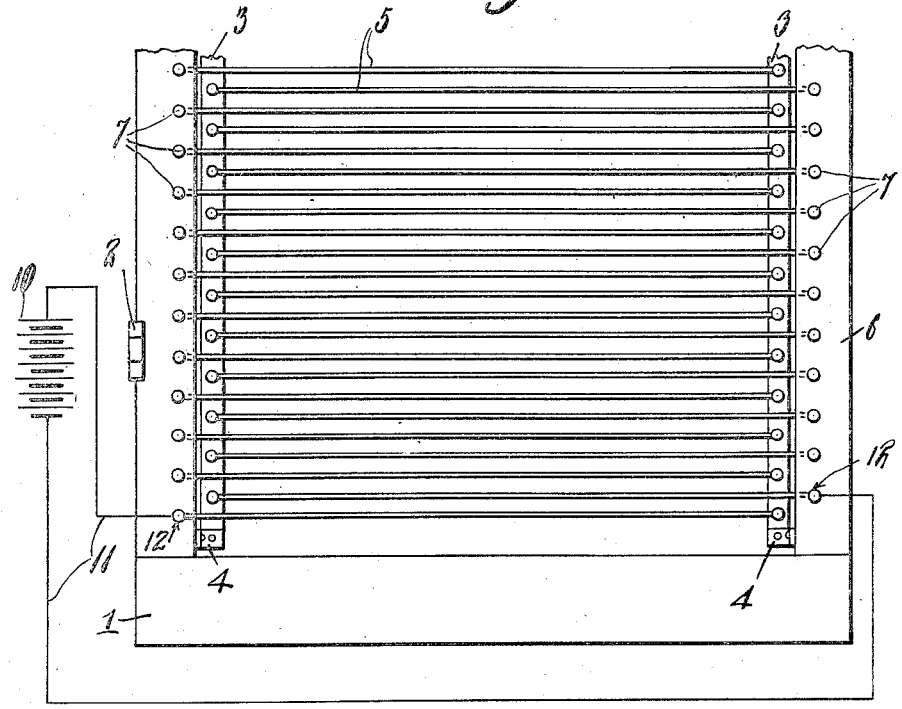
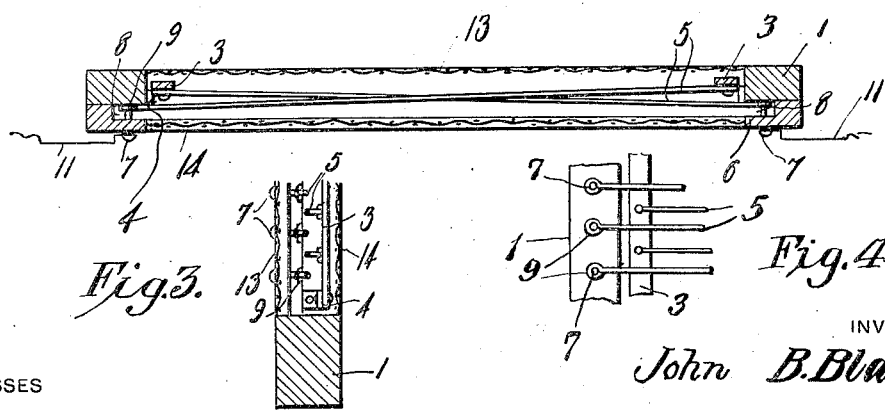
WITNESSES
INVENTOR
John B. Black
BY
ATTORNEY

UNITED STATES PATENT OFFICE.

JOHN B. BLACK, OF KUTTAWA, KENTUCKY.

INSECT-EXTERMINATOR.

1,326,320.                    Specification of Letters Patent.    Patented Dec. 30, 1919.

Application filed December 9, 1916. Serial No. 136,040.

*To all whom it may concern:*

Be it known that I, JOHN B. BLACK, a citizen of the United States, residing at Kuttawa, in the county of Lyon and State of Kentucky, have invented certain new and useful Improvements in Insect-Exterminators, of which the following is a specification.

My invention relates to improvements in insect exterminators, and more particularly to an electrically energized contact bar exterminator.

The invention has for its principal object to provide a trap for destroying flies and other obnoxious insects, which, when the insects come into contact with the active elements thereof, will electrocute them, and thus exterminate the same in a sanitary and efficient manner.

As an object of equal importance, the invention also aims to provide an improved form of active elements, the same being so arranged as to present a substantially screen-like covering, thereby preventing the passage of the insects therethrough unharmed into the building.

It is also an object of the invention to embody with the screen-like construction, an improved guard means therefor, whereby, persons will be prevented from accidentally touching the said active elements.

Among other aims and objects of the invention may be recited, the provision of a device of the character stated with a view to compactness, and in which the number of parts are few, the construction simple, the cost of production small, and efficiency and operation high.

The invention consists, furthermore, in the novel arrangements and combinations of the parts of the device, as well as in the details of the construction of the same, all of which will be more fully described in the following specification, and then finally embodied in the claim appended to this specification and which forms an essential part thereof.

The invention is clearly illustrated in the accompanying drawings, in which:

Figure 1 is a fragmental rear elevation of my improved insect exterminator applied to a shutter or door, the source of electrical energy and the supply circuit being diagrammatically shown and connected thereto, Fig. 2 is a horizontal section, and Fig. 3 is a fragmental vertical section showing a part of the invention hereinafter referred to.

Fig. 4, is a fragmentary front elevation of a portion of the device illustrating the manner in which the rods are supported.

Similar characters of reference are employed in all of the above described views, to indicate corresponding parts.

Referring now more specifically to the several figures of the drawings, the improved exterminator may be said to include a substantially rectangular supporting frame 1, the said frame being preferably of the nature of a shutter or door, provided with suitable hinges 2, which hinges in turn, are secured to the window or door frame of the building to which the device is attached. A pair of vertically disposed bus-bars 3 are secured to the side portions of the frame 1 adjacent the inner faces thereof by means of brackets, indicated by the numeral 4, which brackets are secured to the frame sides and the said bus-bars by means of rivets or other suitable fastening devices.

The active elements of the construction comprise a plurality of horizontally arranged rods, generally indicated by the numeral 5, which rods have certain of the ends thereof alternately secured to the oppositely disposed bus-bars 3 while the remaining ends thereof are extended into engagement with the forward faces of the side portions of the frame 1 and secured thereto in a manner which will be hereinafter more fully described.

A secondary frame, corresponding in size and shape to the frame 1 and designated by the numeral 6 is engaged with the forward face of the said frame 1 and is secured in a fixed position thereupon through the medium of nails or screws 7. As will be noted, the inner edge of the secondary frame 6 is grooved as at 8, thus, providing means whereby the free ends of the active elements 5 may be received. When the nails or screws 7 are driven into the frame 1, the free ends of the said active elements 5, which are provided with eyes 9 are engaged thereby and thus, when the said nails or screws are embedded in the frame 1, the looped ends of the active elements 5 will be supported.

To supply current to the active elements 5, a source of energy 10 is provided and is included in an external circuit comprising conductors 11, the free ends of which are engaged with the lowermost oppositely disposed screws 7, as at 12, thus, permitting the current to energize the bus-bars 3 and consequently, each of the active elements 5. Due to the arrangement of the active elements 5, it will be obvious, that each alternate element will be connected with the positive pole of the source of energy 10 while each intermediate element will be connected with the negative pole of the said source of energy. Thus, an insect upon engaging the positive and negative elements will complete the electric circuit through its body and be electrocuted.

As a means for preventing persons from accidentally contacting with the active elements 5 of the exterminator, I arrange over the frame 1, a screen of coarse mesh 13, securing the edges thereof to the inner face of the frame by suitable means, while over the secondary frame 6, I secure a second screen 14 also composed of coarse mesh. Obviously, by this means, an efficient guard for the exterminator is provided.

It will be understood, that the various positive and negative active elements 5 are arranged in such spaced apart relation as to prevent the passing of insects therebetween into a building unharmed. Furthermore, it will be understood, that the mesh of the guard screens 13 and 14 is of such size as to readily permit the admittance of insects therethrough whereupon, they will alight on the active elements of the exterminator and be killed.

By hingedly mounting the frame 1, it will be appreciated that the frame 1 may be readily swung to a position over the window or door opening to which it is secured. If desired, the conductors 11 may be provided with the usual contact plug which may be engaged with the ordinary lamp socket of the building supply line.

As hereinbefore indicated, I do not wish to be understood as confining the invention to the particular embodiment chosen for illustration herein, nor to the exact construction, arrangement and adaptation of the parts shown and described, but I reserve the right to make any changes and alterations that fairly fall within the spirit and scope of the invention.

I claim:

In a trap of the class described, the combination of a hollow rectangular supporting frame, brackets carried upon the inner portions of said frame, and spaced from the outer surfaces thereof, a bus bar carried by said brackets at each side of and within the frame, said bus bars being parallel to each other, a plurality of horizontally extending rods having one end fixed upon said bus bars, the remaining ends of said rods being secured to the front surface of said frame, the ends of one series of rods connected to one bus bar being in a plane spaced from the plane in which the adjacent ends of the remaining rods secured to the front of the frame are carried, a secondary frame carried upon said first mentioned frame, said secondary frame having grooved side edges for receiving the ends of the rods secured to the front surface of the first mentioned frame, and a protector grating carried by said secondary frame and being spaced from said rods, the spacing of the bus bars within the first mentioned frame preventing interference between the bus bars and the secondary frame.

In testimony whereof I affix my signature in presence of two witnesses.

JOHN B. BLACK.

Witnesses:
E. D. MARSHALL,
ANNA DOOM.